United States Patent [19]
Moret et al.

[11] Patent Number: 5,579,149
[45] Date of Patent: Nov. 26, 1996

[54] MINIATURE NETWORK OF LIGHT OBTURATORS

[75] Inventors: Jean-Marc Moret, Cortaillod; Philippe Renaud, St-Sulpice; Felix Rudolf, St-Blaise; Raymond Vuilleumier, Fontainemelon, all of Switzerland

[73] Assignee: CSEM Centre Suisse d'Electronique et de Microtechnique SA, Neuchatel, Switzerland

[21] Appl. No.: 304,689

[22] Filed: Sep. 12, 1994

[30] Foreign Application Priority Data

Sep. 13, 1993 [FR] France ................... 93 10960

[51] Int. Cl.⁶ .................................................. G02B 26/08
[52] U.S. Cl. .......................... 359/223; 359/225; 359/298; 359/856; 345/85; 345/109
[58] Field of Search ........................ 359/223–226, 359/230, 290, 291, 317–319, 850, 855, 856, 298; 345/55, 84, 85, 108, 109; 348/203, 205, 740, 750, 755, 771; 250/229, 232, 233

[56] References Cited

U.S. PATENT DOCUMENTS

| | | | |
|---|---|---|---|
| 4,087,810 | 5/1978 | Hung et al. | 345/206 |
| 4,383,255 | 5/1983 | Grandjean et al. | 345/109 |
| 4,420,896 | 12/1983 | Castleberry | 40/427 |
| 4,566,935 | 1/1986 | Hornbeck | 437/228 |
| 4,571,603 | 2/1986 | Hornbeck et al. | 347/239 |
| 4,786,149 | 11/1988 | Hoenig et al. | 359/290 |
| 4,950,881 | 8/1990 | Kaltschmidt | 250/203.6 |
| 5,101,236 | 3/1992 | Nelson et al. | 355/229 |
| 5,369,433 | 11/1994 | Baldwin et al. | 348/207 |

FOREIGN PATENT DOCUMENTS

| | | |
|---|---|---|
| 143079 | 5/1985 | European Pat. Off. |
| 453400 | 10/1991 | European Pat. Off. |
| 469293 | 2/1992 | European Pat. Off. |
| 2542105 | 9/1984 | France |

OTHER PUBLICATIONS

Novel Electromechanical Microshutter Display Device, R. Vuilleumier, Eurodisplay, Sep. 1984, Paris, France, pp. 441–444.

Optical Microshutters and Torsional Micromirrors for Light Modulator Arrays, V. P. Jaecklin, MEMS, Feb. 10, 1993, Ft. Lauderdale, Fl, pp. 124–127.

Deformable–Mirror Spatial Light Modulators, L. J. Hornbeck, Spatial Light Modulators and Applications, Aug. 1989, San Diego, CA, pp. 86–102.

Micromechanical Light Deflector Array, K. E. Petersen, IBM Technical Disclosure Bulletin, vol. 20, No. 1, Jun. 1977, US, pp. 355–356.

*Primary Examiner*—Paul M. Dzierzynski
*Assistant Examiner*—Darren E. Schuberg
*Attorney, Agent, or Firm*—Sughrue, Mion, Zinn, Macpeak & Seas

[57] ABSTRACT

The obturators can be actuated in order to modulate an incident beam (L). Microshutters (5) are attached to a substrate by means of fastenings opposing resistance to their rotation away from a rest position. The microshutters (5) are placed on optical paths (X—X) so as to be able to interrupt them or establish them. They are fitted out with reflecting surfaces (7) so as to deflect the light when they are in the blocking position. On each optical path (X—X) a supplementary reflecting surface (8), a diaphragm (6) and a focusing means (4) are placed. Thus, in line with its position, each microshutter can focus the light on the diaphragm (6) so as to allow it to pass or to deflect it in order to block it. The application thereof is in the transformation of a beam (L) into a modulated beam (Lm).

10 Claims, 6 Drawing Sheets

MINIATURE NETWORK OF LIGHT OBTURATORS

The present invention relates to a network of miniature light obturators intended more specifically to transform a luminous beam into a set of light points, matricial or linear in form, each of such points being selectively capable of activation or disactivation in order to allow passage of, or to block light. Such a network can also be called "light modulating network".

BACKGROUND OF THE INVENTION

Networks of this type have already been perfected and described, in particular in patents U.S. Pat. No. 4,383,255 and EP-0 453 400 A1, in a paper by R. Vuilleumier et al., appearing on the occasion of the Eurodisplay 84 Conference, September 1984, Paris and, more recently, in two papers by V. P. Jaecklin et al., appearing respectively on the occasion of the MEMS-93 held from 7 to 10 Feb. 1993 in Ft. Lauderdale, Fla., U.S.A. and in the Digest of Technical Papers in TRANSDUCERS, Yokohama, Japan, 7 to 10 Jun. 1993.

The network described in the next to last document mentioned hereinabove comprises a substrate in which are formed the obturators of the network. Each obturator includes a microshutter attached to the substrate by elastic fastenings resisting rotational movement of the microshutter away from a predetermined rest position. The network also includes electrostatic control means for the microshutters in order to control selectively the rotation thereof through a relatively small angle. Furthermore, each microshutter is fitted out with a reflecting surface.

The network, and more specifically the reflecting surfaces of the microshutters can be irradiated by a luminous beam to be modulated, the modulation being carried out by causing the microshutters, the control of which can be matricial, to rotate selectively.

The invention has as purpose to put forward an improved network of miniature light shutters of the nature briefly described hereinabove.

SUMMARY OF THE INVENTION

The invention has thus as object a network of miniature light obturators, intended more specifically to transform a luminous beam into modulated light, composed of a matricial or linear set of points of light, each of such obturators being capable of selective activation or disactivation in order to allow passage of, or to block the light, said network comprising a substrate to which microshutters respectively forming said obturators are attached by means of elastic fastenings opposing resistance to their rotation away from a predetermined rest position, said network also including control means for the microshutters for selectively controlling the rotation thereof away from said rest position, said microshutters being respectively placed in the optical paths of said light in order to be able to interrupt or to establish said paths in accordance with their position, each microshutter further being fitted out with a reflecting surface for deflecting said light when it is in its blocking position, said network being characterized in that, in the optical path associated with each microshutter, a supplementary reflecting surface and a diaphragm as well as a focussing means are placed in a manner such that when said microshutter is in the one of its positions the light is focussed on said diaphragm in order to allow such light to pass and that the latter is deflected relative in said diaphragm and consequently blocked when said microshutter is in its other position.

One of the advantages obtained by a network according to the characteristics which have just been enunciated resides in the selectivity between passing and blocking of the light which amounts, so to speak, to beam switching by all or nothing. This property goes hand in hand with the advantages already assured in the network described in the article analyzed hereinabove and which consist, in particular, on the one hand in the very small rotational angle (to give an idea, the latter can be on the order of 7° degrees only) and, on the other hand, in the low control voltage and the very short response time, which properties result from this small angle of rotation.

Furthermore, thanks to the characteristics of this network, it is possible to collect a substantial portion of the incident light (typically more than half) striking each microshutter in order to form the output beam associated with the latter. There results therefrom a very favourable luminous yield of the network according to the invention.

Other characteristics and advantages of the invention will appear in the course of the description to follow given solely by way of example and prepared having reference to the attached drawings.

DESCRIPTION OF THE PREFERRED EMBODIMENTS

Figure 1:
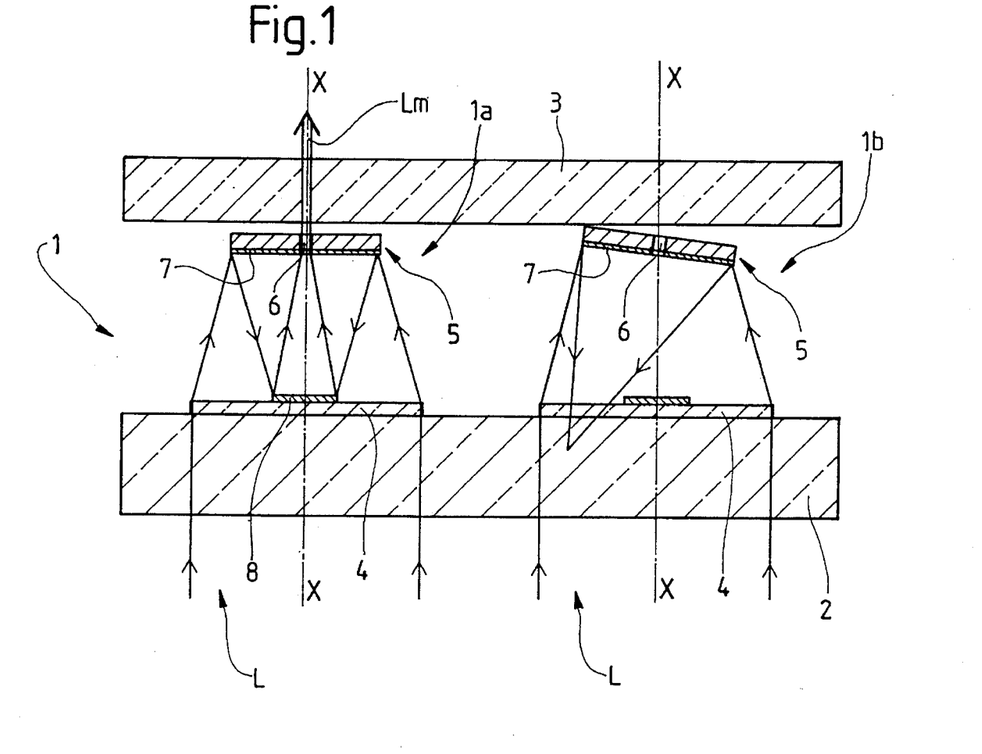
FIG. 1 shows schematically two individual obturators of a network according to the invention, the microshutter of one of such obturators being in the activated position, that of the other being in its non-activated position.

Reference will be made initially to FIG. 1 which shows the principle of design and operation of a network of light obturators according to the invention, in conformity with a first embodiment thereof.

Obturators 1a, 1b, . . . etc. each define an optical path X—X which is preferably parallel to the general direction of the incident light L striking the network. It is clear that this latter comprises a large number of obturators 1a, 1b, . . . etc. cooperating together and arranged for example in a matrix array.

Network 1 comprises a transparent plate 2, preferably of glass, through which the light beam L may enter. On the opposite side the network comprises an output plate 3, likewise transparent and preferably of glass, through which exits the modulated light Lm as a function of the control method of the network (for example, matricial).

Each obturator 1a, 1b, . . . includes, centered on the optical path X—X associated therewith, a convergent focussing lens 4 and a microshutter 5 provided with a diaphragm 6 and exhibiting a reflecting surface 7 as well as a supplementary reflecting surface 8 which is formed on lens 4.

On FIG. 1 obturator 1a is in a so-called non-activated configuration which is to say that no control voltage is applied thereto. This is also to say, within the context of the embodiment here described, that the obturator 1a allows passage of the light through its diaphragm 6. The incident light L, being initially focussed by lens 4, is sent backwards by the reflecting surface 7 of microshutter 5, then reflected forwardly by the supplementary reflecting surface 8 and finally sent towards the exterior through diaphragm 6 in order to pass through the support plate 3 and to become a component of the modulated light beam Lm.

Conversely, obturator 1b is shown in its so-called activated configuration in which its microshutter 5 is turned through a small angle (7° for example) about an axis Y—Y (not indicated on FIG. 1) which is perpendicular to axis X—X. To attain this configuration, a control voltage must be applied to the obturator 1b, as will be described in detail hereinafter.

It is seen that the activated configuration leads to deflecting the light beam, sent back by the reflecting surface 7 present on microshutter 5 and initially focussed by lens 4, outside the field associated with the supplementary reflecting surface 8. The latter is thus no longer in position to cause passage of the light through diaphragm 6.

The suppression of the control voltage resets the microshutter 5 into its initial position (that of obturator 1a) thanks to the elastic strain force generated in the microshutter fastenings which will be described in detail hereinafter.

It is thus clear that the new arrangement recommended by the invention leads to an unequivocal all or nothing control of the points materialized by the diaphragms 6 of the obturators. Seen from the side of the output plate 3, the non-activated configuration corresonds to the presence of a luminous point and the inverse case to the absence of such a point.

The terms "non-activated" and "activated" used in the present description must not be taken in the strict sense. Effectively, they designate simply the presence and respectively the absence of light at the output of an obturator, which situations can be obtained either by the presence or the absence of a control voltage according to the configuration and the form of the electrodes which are associated with each microshutter.

Reference will now be made to FIGS. 2 to 5 which illustrate more specifically a preferred design of the network according to the invention.

As already indicated with reference to FIG. 1, the network comprises an input plate 2 and an output plate 3. Between such plates 2 and 3 is arranged a wafer 9 forming a substrate which preferably is of silicon. Such wafer 9 is micromachined in order to form thereon the microshutters 5 and the sets of electrodes which are associated therewith.

A frame 10 forming a spacer surrounds the network of microshutters and maintains a defined distance between the output plate 3 and wafer 9.

A preferred method of micro-machining which can be used in order to obtain the desired forms in such wafer 9 is described in the patents and articles previously cited and it is thus not necessary to return thereto within the present description.

Figure 2:
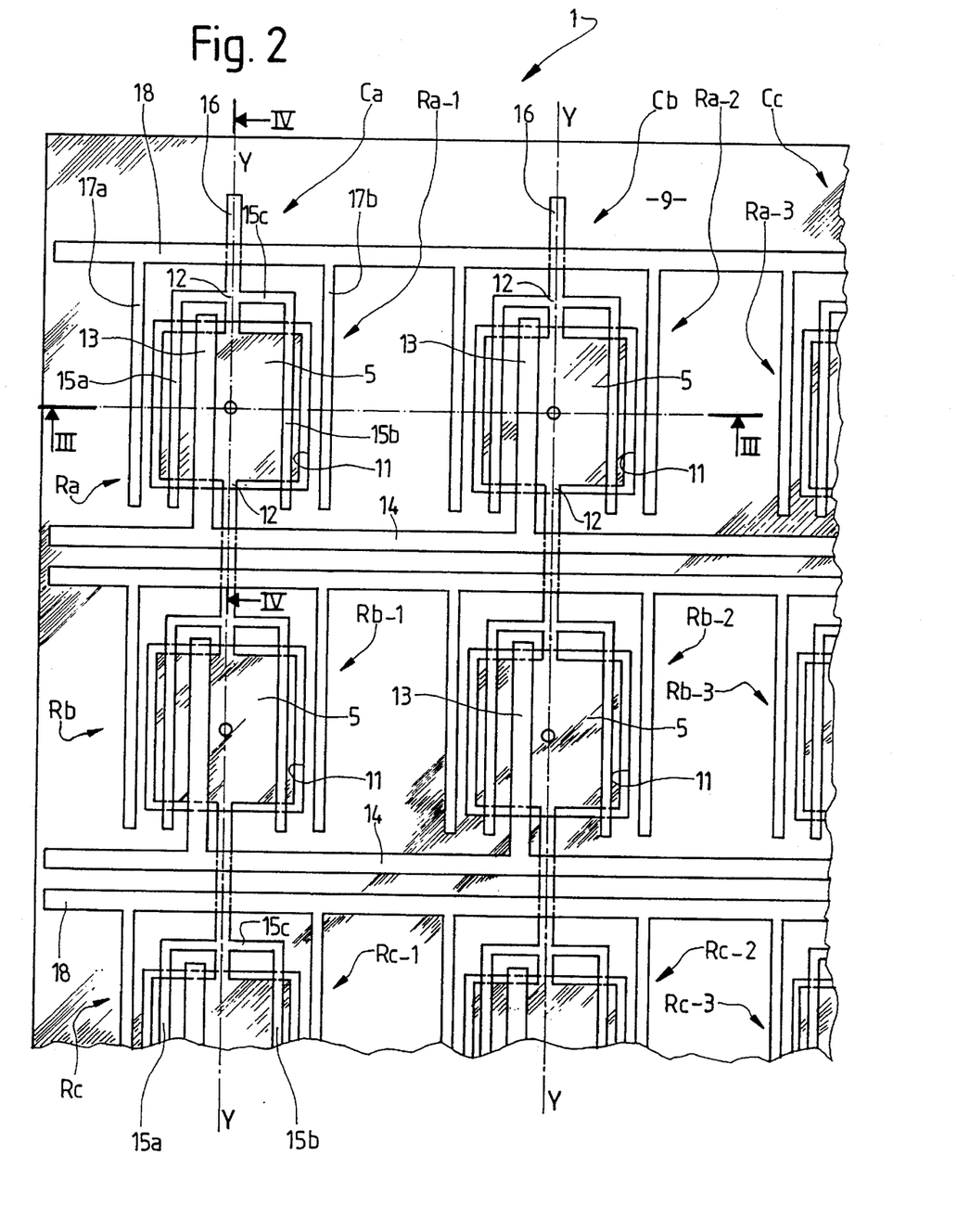
FIG. 2 is a highly enlarged representation of four obturators in a network according to the invention.

As can be determined from FIG. 2, network 1 is matricial with rows Ra, Rb, Rc, . . . and columns Ca, Cb, Cc, . . . of obturators which are respectively referrenced Ra-1, Ra-2, Ra-3, . . . Rb-1, Rb-a, Rb-3 . . . etc., each row comprising typically 100 obturators and the number of network rows being for example 50.

Figure 5:
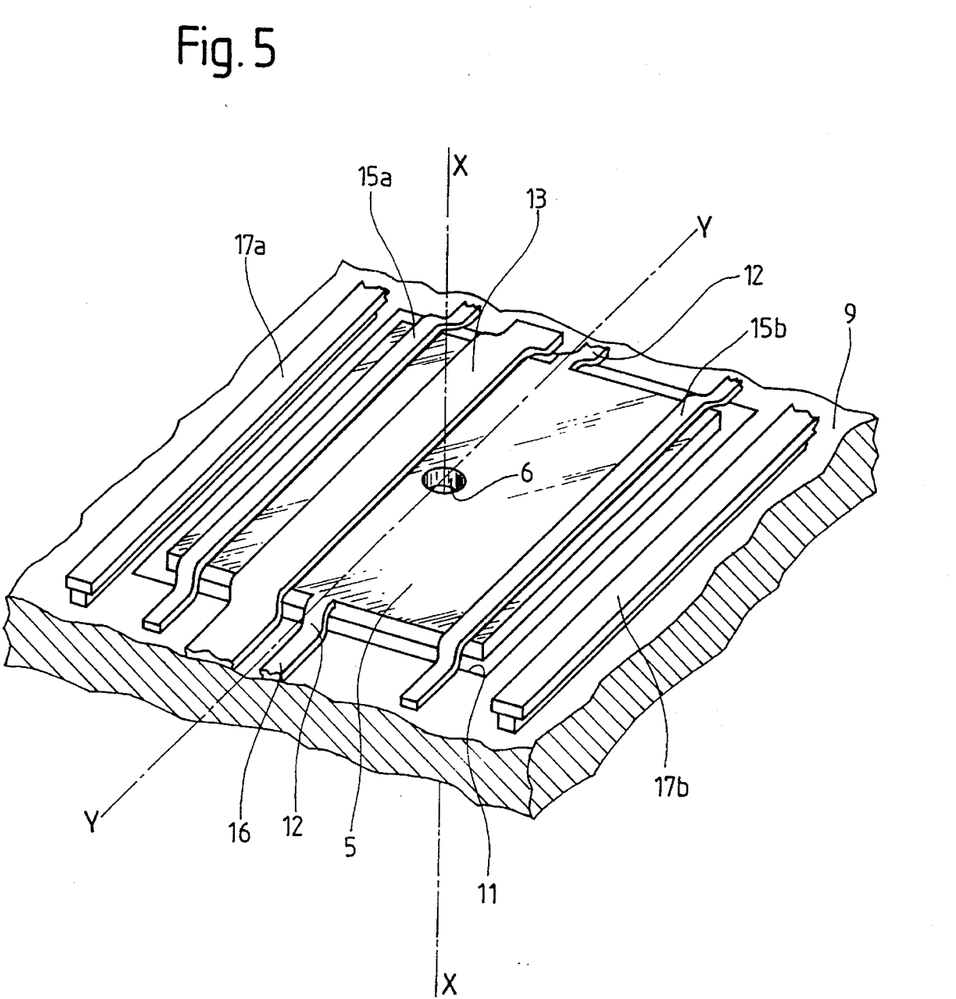
FIG. 5 is a very large scale perspective view of a microshutter and its associated control electrodes.

FIG. 5 which is a perspective view of a single microshutter 5 and its electrodes shows clearly that the microshutter 5 is arranged in an opening 11 formed in the wafer 9 and that it is attached to the latter by two elastic fastenings (or suspension arms) 12 aligned along the axis Y—Y, perpendicular to the optical axis X—X of the obturator under consideration, such axis Y—Y being the rotation axis of the microshutter 3.

Parallel to axis Y—Y extend (see FIGS. 2 and 5):
  a control electrode 13 electrically connected to a common control conductor 14 (FIG. 2) running along the row of microshutters under consideration;

two stop electrodes 15a and 15b connected in common by a conductor 15c to a conductor 16 which also connects together all the microshutters 5 from a common column of the network by means of their conductive fastenings 12;

two holding electrodes 17a and 17b which extends in the direction of the columns along the opposite edges of opening 11. Such electrodes are connected together in row by a common conductor 18.

The control electrodes 13 and stop electrodes 15a and 15b extend across opening 11 above each microshutter 5. For the rest, conductors 16 cross conductors 14 and 18 without being electrically connected to the latter.

Figure 6:
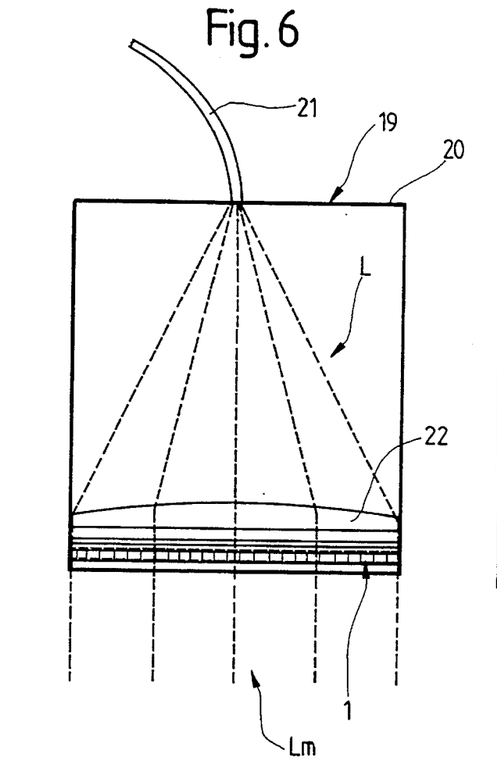
FIG. 6 shows very schematically and at small scale a light switching unit incorporating a network conceived according to the invention.

As appeared clearly on FIG. 6 of the first previously cited papers by V. P. Jaecklin et al, the displacement characteristic as a function of the control voltage of a microshutter such as is used in the present invention exhibits hysteresis. From this fact, it is then possible to bring about matricial addressing, such for example as that described in the previously cited European patent, by means of a judicious combination of electrodes and appropriate control voltages.

It is thus determined that the network conceived in this way can be controlled in a matricial manner by applying to conductors 14, 16 and 18 appropriate signals in binary form. Thus, the network enables transforming a wide luminous beam into a matrix of luminous points each point of which can be individually controlled.

The reflecting surfaces 7 and 8 are advantageously obtained in the form of aluminium layers deposited by evaporation or sputtering techniques. Lenses 4 can be directly achieved by micro-machining in the input plate 2, for example in the form of Fresnel lenses, at the center of which are respectively provided layers for realizing the supplementary reflecting surfaces 8. The lenses can also be obtained in the form of diffracting optical elements.

By way of example, a microshutter of network 1 can have a square form of 100 micrometers on each side, the diaphragm 6 being circular and having a diameter chosen between 5 and 20 micrometers. In view of the low rotation angle of the microshutters, the switching time for each obturator can be of only 50 microseconds with a control voltage of 15 volts.

Figure 7:
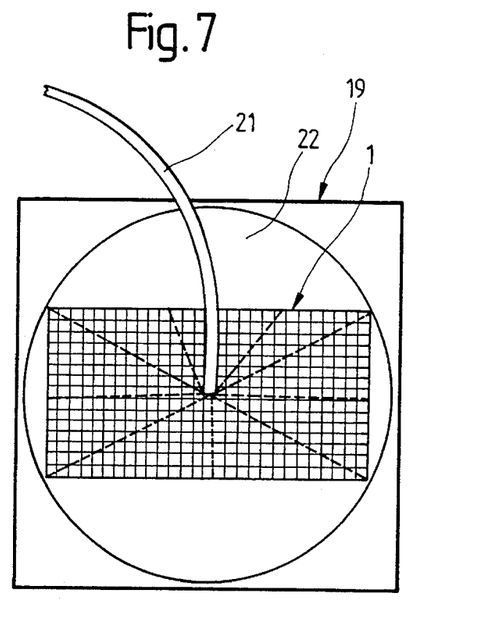
FIG. 7 is a schematic top view of the unit of FIG. 6.

An example of application of a network 1 according to the invention is shown on FIGS. 6 and 7. In this case, it is placed into an opaque cylindrical capsule 19, the top 20 of which is pierced in a manner such that a light beam can be introduced therein from an optical fibre 21. Network 1 is placed in the bottom opening of capsule 19, a collimating lens 22 being placed in its neighbourhood in order to form a collimated beam irradiating network 1 from the entering beam. By way of example, the network 1 can comprise 100 obturators per row and 50 obturators per column. FIG. 7 shows schematically how the network 1 and lens 22 can be associated, the top 20 of the capsule being supposed removed.

Figure 8:
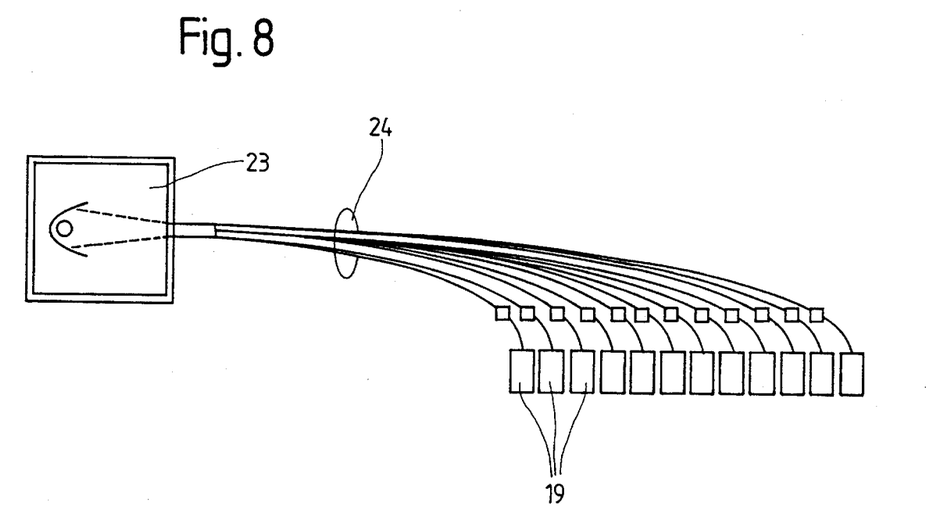
FIG. 8 shows schematically how multiple units according to FIGS. 6 and 7 can be used in combination in order to form a light distribution arrangement.

FIG. 8 shows an application of a series of capsules 19 according to FIGS. 6 and 7 in order to set up an arrangement for the distribution of light. In this case, a luminous source 23 is linked by a bundle 24 of optical fibres to a row of capsules 19. Such arrangement permits, for example, the printing of pages at high definition in letting a photosensitive support to pass in front of the row of capsules, each microshutter network being suitably controlled as described hereinabove.

It can be likewise envisaged to use a network 1 of large dimensions for the projection of images of the television type. In this case a light modulating network according to the invention could assure high definition in providing for each colour component a network comprising a very large number of obturators.

Figure 9:
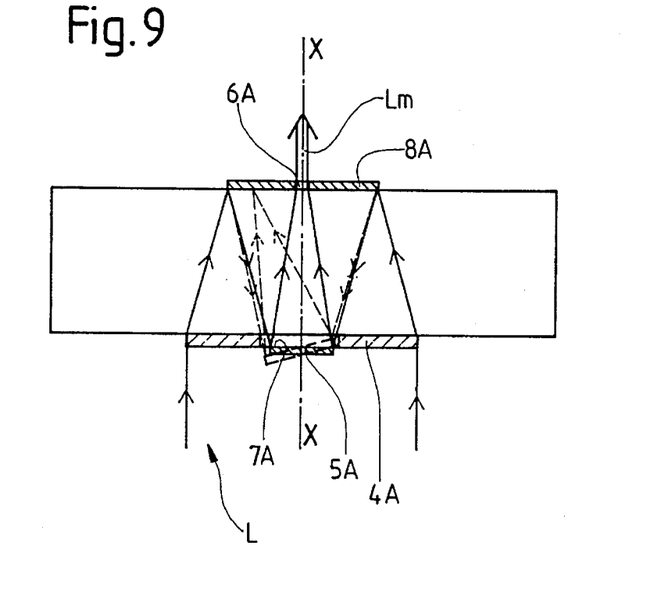
FIG. 9 shows by a schematic view, again at very large scale, a variant embodiment of the invention.

FIG. 9 shows a variant of the invention obtainable at the level of each obturator in the network. In this case, a microshutter 5a with its reflecting surface 7a is placed at the center of the focussing lens 4a while the supplementary mirror 8A is formed on the opposite side and provided with diaphragm 6A.

Figure 3:
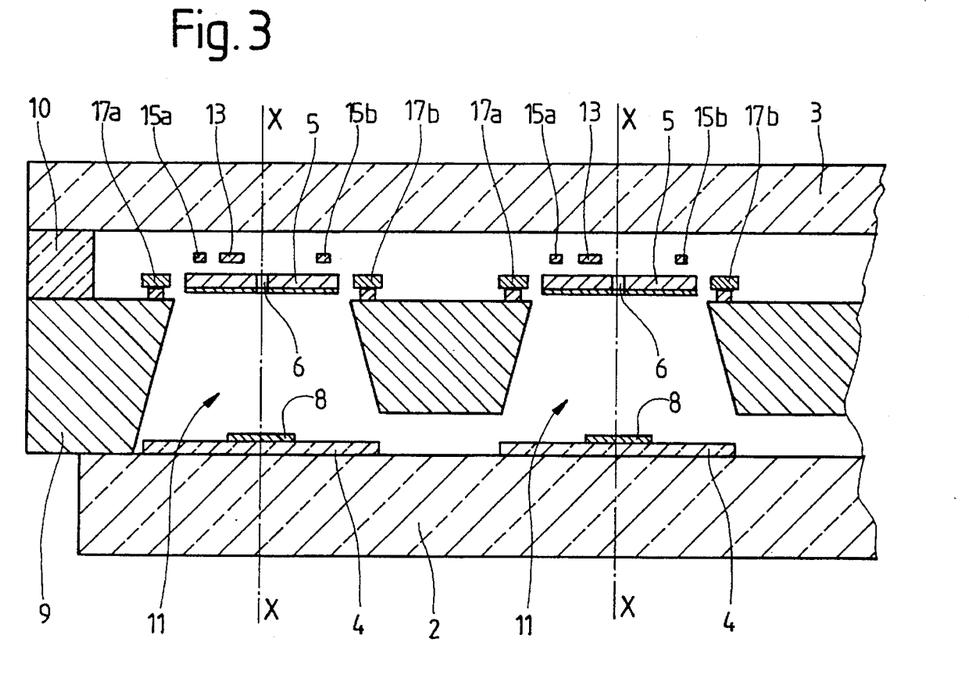
FIG. 3 is a cross-section view along line III—III of FIG. 2.
Figure 4:
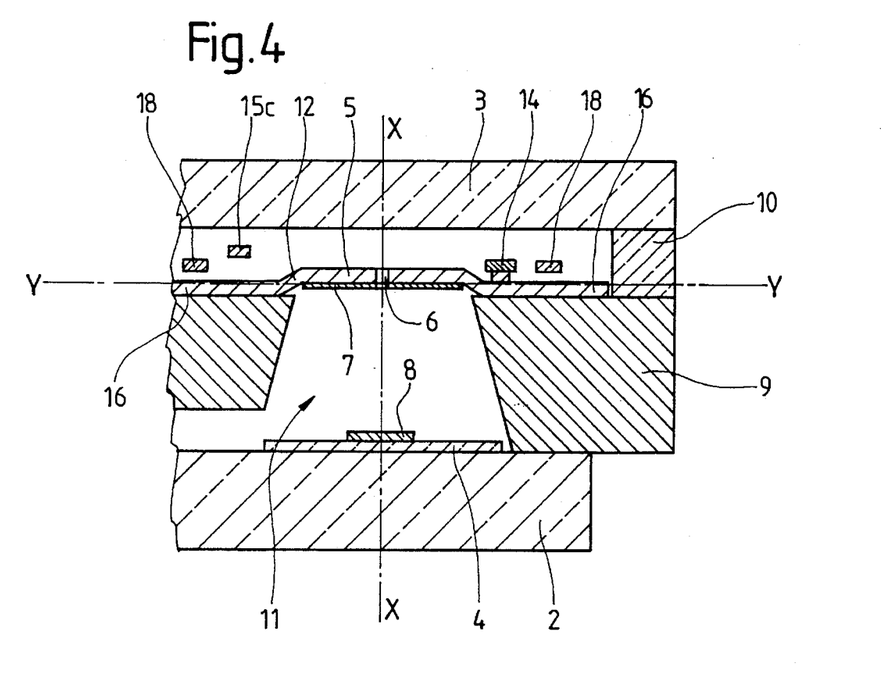
FIG. 4 is a cross-section along line IV—IV of FIG. 2.
Figure 10:
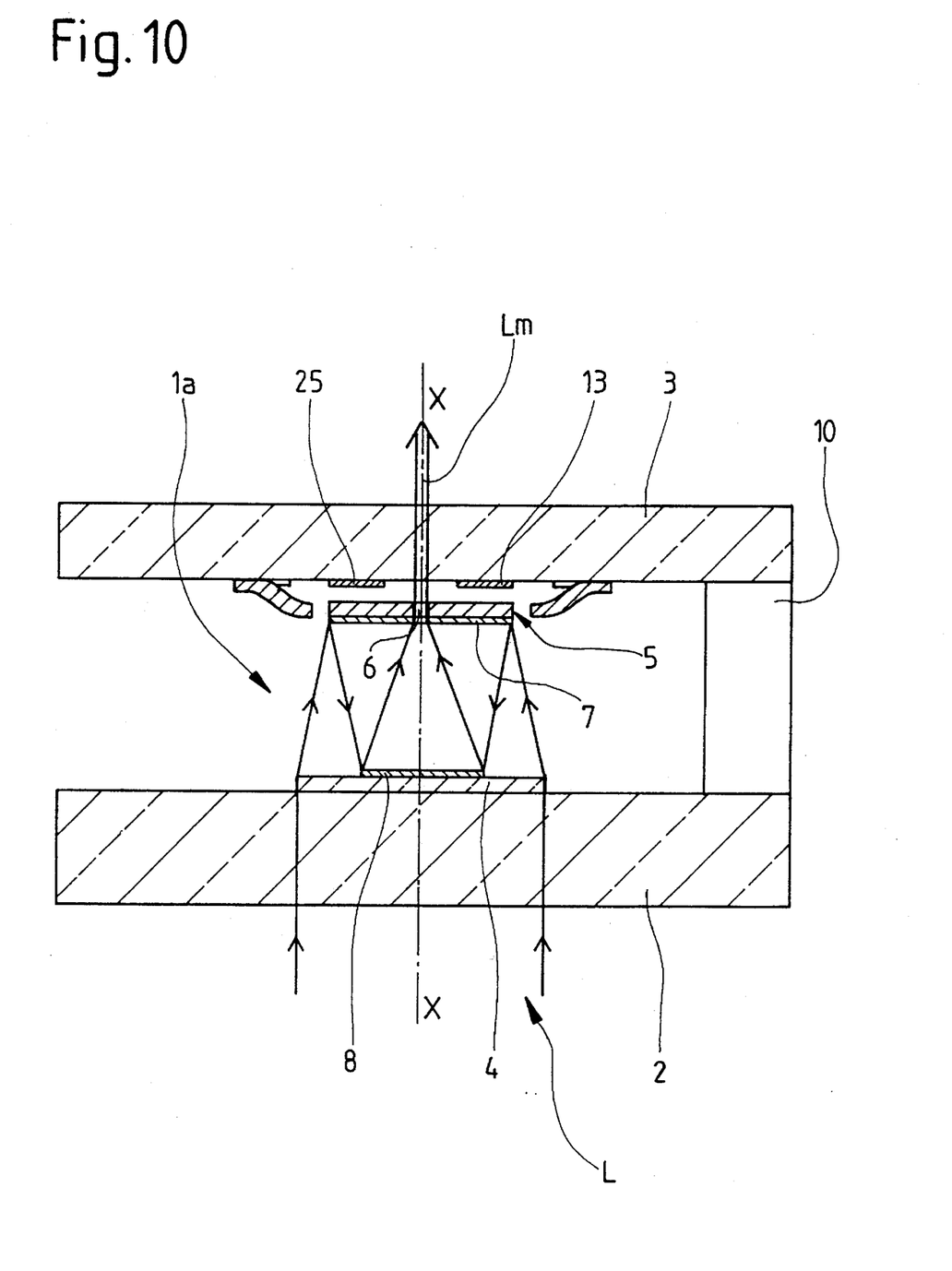
FIG. 10 shows a variant embodiment of an obturator according to the invention.

FIG. 10 shows another embodiment of the invention which, from the optical viewpoint, is similar to the embodiment of FIGS. 3 to 5, but which differs therefrom by its design. In this case, the network of obturators is directly formed on the output plate 3 instead of being so formed in a distinct silicon wafer. The network is then built up with the help of thin layers of polysilicon exhibiting the same electrodes as on FIGS. 3 to 5. It may be desirable, not only in this embodiment but aslo in those described hereinabove, to provide as a supplement a so-called compensating electrode indicated by reference 25 on FIG. 10. This electrode has as purpose to maintain the microshutter 5 in its horizontal position when it is in the rest state. In effect, it can happen that in the absense of all control voltage such latter is slightly rotated.

As is well understood, other variant embodiments are possible within the framework of the present invention.

What we claim is:

1. A network of miniature light obturators for transforming the light of a luminous beam into modulated light in the form of a matricial or linear set of points of light, each of said obturators being capable of selective activation or deactivation in order to allow passage of, or to block, the light of the luminous beam, said network comprising:

a substrate to which microshutters, respectively forming said obturators, are attached by means of elastic fastenings resisting rotation of said microshutters away from a predetermined rest position;

control means for selectively controlling rotation of the microshutters away from said rest position to a second position, said microshutters being respectively placed in optical paths of the light of said luminous beam in order to be able to block or to enable passage of the light of the luminous beam along said paths in accordance with the position of each microshutter, each microshutter further being fitted with a reflecting surface for deflecting said luminous beam light when the microshutter is in its light-blocking position; and a supplementary reflecting surface, a diaphragm and a focusing means which are placed in the optical path associated with each microshutter in a manner such that, when said each microshutter is in one of its positions, the luminous light beam is focused on said diaphragm in order to allow the luminous light beam to pass, and, when said each microshutter is in the other of its positions, the luminous light beam is deflected relative to said diaphragm and consequently blocked, said supplementary reflecting surface being provided at the center of said focusing means, and said diaphragm being in said each microshutter.

2. The network of obturators as set forth in claim 1, wherein said focusing means is a converging lens.

3. A network of obturators as set forth in claim 2, wherein said lens is a Fresnel type lens.

4. A network of obturators as set forth in claim 2, wherein said lens is a diffracting optical element.

5. The network of obturators as set forth in claim 1, said microshutters and said control means being micromachined on a single silicon wafer extending perpendicularly to said optical paths.

6. The network of obturators as set forth in claim 5, said wafer being assembled between two transparent plates parallel thereto, with interposition of a spacer frame, said plates respectively forming an input plate and an output plate for said network, and said focusing means being micromachined in said input plate.

7. The network of obturators as set forth in claim 1, said each microshutter being placed in the center of said focusing means, and said diaphragm being located in the center of said supplementary reflecting surface.

8. A network of miniature light obturators for transforming the light of a luminous beam into modulated light in the form of a matricial or linear set of points of light, each of said obturators being capable of selective activation or deactivation in order to allow passage of, or to block, the light of the luminous beam, said network comprising:

a substrate to which microshutters, respectively forming said obturators, are attached by means of elastic fastenings resisting rotation of said microshutters away from a predetermined rest position;

control means for selectively controlling rotation of the microshutters away from said rest position to a second position, said microshutters being respectively placed in optical paths of the light of said luminous beam in order to be able to block or to enable passage of the light of the luminous beam along said paths in accordance with the position of each microshutter, each microshutter further being fitted with a reflecting surface for deflecting said luminous beam light when the microshutter is in its light-blocking position; and a supplementary reflecting surface, a diaphragm and a focusing means which are placed in the optical path associated with each microshutter in a manner such that, when said each microshutter is in one of its positions, the luminous light beam is focused on said diaphragm in order to allow the luminous light beam to pass, and, when said each microshutter is in the other of its positions, the luminous light beam is deflected relative to said diaphragm and consequently blocked, said each microshutter being placed in the center of said focusing means, and said diaphragm being located in the center of said supplementary reflecting surface.

9. A network of miniature light obturators for transforming the light of a luminous beam into modulated light in the form of a matricial or linear set of points of light, each of said obturators being capable of selective activation or deactivation in order to allow passage of, or to block, the light of the luminous beam, said network comprising:

a substrate to which microshutters, respectively forming said obturators, are attached by means of elastic fastenings resisting rotation of said microshutters away from a predetermined rest position;

control means for selectively controlling rotation of the microshutters away from said rest position to a second position, said microshutters being respectively placed in optical paths of the light of said luminous beam in order to be able to block or to enable passage of the light of the luminous beam along said paths in accordance with the position of each microshutter, each microshutter further being fitted with a reflecting surface for deflecting said luminous beam light when the microshutter is in its light-blocking position; and a supplementary reflecting surface, a diaphragm and a focusing means which are placed in the optical path associated with each microshutter in a manner such that, when said each microshutter is in one of its positions, the luminous light beam is focused on said diaphragm in order to allow the luminous light beam to pass, and, when said each microshutter is in the other of its positions, the luminous light beam is deflected relative to said diaphragm and consequently blocked, wherein said supplementary reflecting surface is formed by a specular layer deposited at the center of said focusing means.

10. A network of miniature light obturators for transforming the light of a luminous beam into modulated light in the form of a matricial or linear set of points of light, each of said obturators being capable of selective activation or deactivation in order to allow passage of, or to block, the light of the luminous beam, said network comprising:

a substrate to which microshutters, respectively forming said obturators, are attached by means of elastic fastenings resisting rotation of said microshutters away from a predetermined rest position;

control means for selectively controlling rotation of the microshutters away from said rest position to a second position, said microshutters being respectively placed in optical paths of the light of said luminous beam in order to be able to block or to enable passage of the light of the luminous beam along said paths in accordance with the position of each microshutter, each microshutter further being fitted with a reflecting surface for deflecting said luminous beam light when the microshutter is in its light-blocking position; and a supplementary reflecting surface, a diaphragm and a focusing means which are placed in the optical path associated with each microshutter in a manner such that, when said each microshutter is in one of its positions, the luminous light beam is focused on said diaphragm in order to allow the luminous light beam to pass, and, when said each microshutter is in the other of its positions, the luminous light beam is deflected relative to said diaphragm and consequently blocked, wherein said microshutters and said control means are directly micromachined on a transparent plate forming an output plate for the network, said transparent output plate being arranged parallel to a transparent input plate for the network, with interposition of a spacer frame, and said input plate being micromachined in said focusing means.

\* \* \* \* \*